INDEXING AND SPEED CONTROL SYSTEM
FOR MAGNETIC REPRODUCERS
Filed Sept. 14, 1944

INVENTOR

Jacob Neufeld

Patented Jan. 31, 1950

2,496,103

UNITED STATES PATENT OFFICE 2,496,103

INDEXING AND SPEED CONTROL SYSTEM FOR MAGNETIC REPRODUCERS

Jacob Neufeld, Tulsa, Okla.

Application September 14, 1944, Serial No. 554,045

11 Claims. (Cl. 179—100.2)

This invention relates to an automatic control system for recording and reproducing of sensory effects and more particularly to a control system for recording and reproducing apparatus of sensory effects of the kind, wherein there is employed a record body which must be driven relatively to a recording or reproducing device to effect recording or reproduction.

In the embodiment to be described, an acoustic recording and reproducing apparatus of the telegraphone type is employed. As is well known in telegraphones, the signals are recorded by varying the magnetic condition of a moving magnetic body, and are reproduced by causing such a magnetized body to vary the magnetic induction in a suitable translating device.

The object of the invention, is to provide a novel method and apparatus of the kind, and, in general, to improve the operation of the telegraphone system.

Another object of the invention, is to provide a system, in which a recorder for the reproduction of a sensory, and, in particular, of an acoustic effect, carries thereon an operating component to operate said recorder.

Another object of the invention, is to provide a controlling and sensory system, said sensory system being preferably an acoustical system, in which the sensory (acoustical) effect and the devices to be controlled are correlated to provide automatically for a predetermined time relationship in their operation with very little possibility of confusion.

Another object of the invention, is to provide a record in a sound reproducing device, said record having means to control the operation of the device in conjunction with the reproducing of a predetermined sound sequence or other sensory effect, the operation of the device being controlled from such record.

Another object resides in providing a sound reproducing device including a sound record for reproducing a sound sequence, and for actuating said device from impulses in the sound record itself during the reproduction of the sequence and without interrupting and modifying the same.

Another object of the invention resides in providing a sound recording and reproducing machine of telegraphone type having associated therewith an indicating device, by means of which any sound selection recorded on any section of the magnetized body may be readily located.

In carrying out my invention, I provide a pair of reels spaced apart and adapted to pass sound tape from one to another. The reels are actuated by a driving system which is adapted to rotate in either direction. The recording and reproducing unit is positioned between the reels, so that the sound wire passes through either of them in moving from one reel to another.

My indicator device comprises an indicating device which indicates the length of sound wire that has been removed from the reel and passed through the recording or reproducing unit. When a talk or musical number is to be recorded on the sound tape, the indication of said device at the beginning of the recordation is noted, and permanent notations are made of said indication. At the end of the talk or musical number, the indication of said device is again noted and recorded. The indication of the device varies only when the reels are rotated, and will accurately indicate at any instant the particular section of sound wire going through the sound reproduction unit during each and every reeling and unreeling operation. By reference to the notations made when the particular section desired was impressed upon the sound wire, or tape, this selection can be accurately located and reproduced by first driving the machine to the point where the indicating device points to the recorded notation, and then placing the sound reproducing unit in operative engagement with the sound wire.

This invention has numerous applications and is intended among other things to automatic advertizing and time announcement apparatus to be used in connection with telephone systems, the apparatus being arranged to be started on reception of a special signal dialled by the telephone subscriber, so that any subscriber who dials this signal would hear the announcement in question.

The invention will be more readily understood from the following description taken in connection with the accompanying drawing forming a part thereof, in which.

Figure 1:
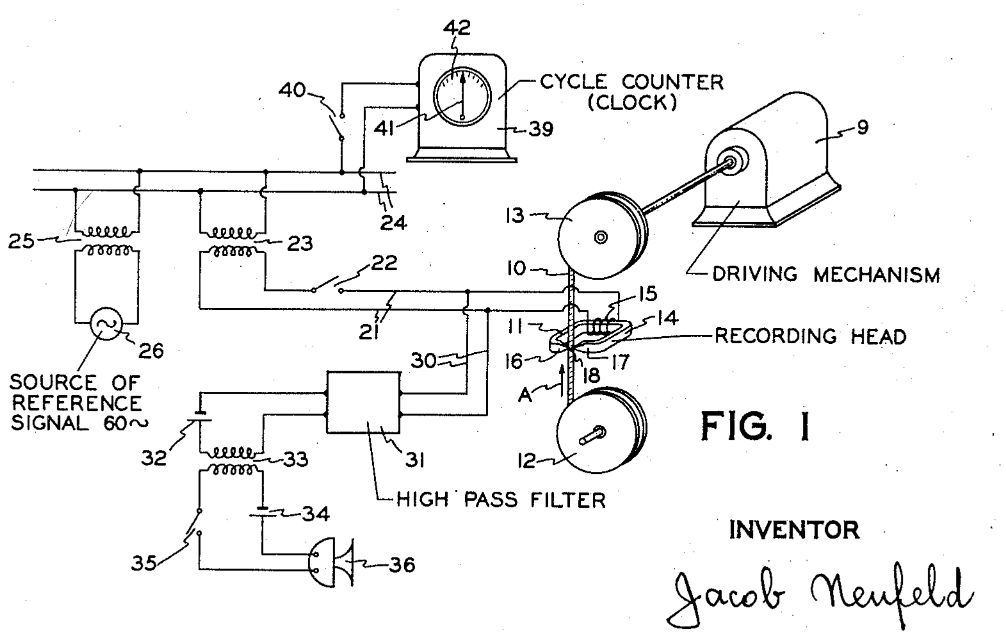
Figure 1 represents an arrangement for permanently magnetizing a magnetic tape or wire in accordance with the signals to be transmitted, and thus forming a permanent magnetic impression upon said tape or wire of the desired signals for a subsequent reproduction.

In Figure 1 the reference numeral 10 identifies the sound record strip consisting of a magnetic tape .001 inch thick and .125 inch wide that runs upwards, as indicated by the arrow in proximity to the recording head 11. Two spools or reels 12, 13 serve as support for the wire in a well known manner and are arranged to be driven by the driving mechanism 9.

In accordance with a specific feature of this invention, the record is made on a very thin slowly moving tape having high magnetic retentivity, by transverse magnetization induced by pole pieces contacting, or nearly contacting either side of the tape directly opposite each other, the pole pieces being made of laminations of magnetic material of high initial permeability, high resistivity and very low retentivity, and being tapered at one end so that the portion adjacent the tape is in the form of a very thin lamination extending across the tape.

The recording head consists of an electromagnet having an iron core 14 and a winding 15 wound around the core 14. The core 14 is provided with two pole pieces 16, 17 immediately adjacent one to another. The pole pieces are provided with sharp edges in form of knife blades in order to localize within a narrow zone of exploration the flux that passes between them. The narrow air gap between the pole pieces 16, 17 is designated by 18. The tape 10 is made to pass through the air gap in such a manner, that the plane of the tape is perpendicular to the line joining the pole pieces 16 and 17. The winding 15 is connected through leads 21, switch 22, and transformer 23 to leads 24, which are fed by a standard source of voltage 26 having a fixed frequency of 60 cycles per second. The winding 15 is also connected through leads 30 to the input terminals of a high pass filter 31. The output terminals of the filter 31 are connected through battery 32 to the secondary winding of a transformer 33, the primary winding of which is connected through the battery 34 and switch 35 to the microphone 36. The high pass filter 31 is arranged to transmit frequencies above 100 cycles per second.

When it is desired to impress sound upon the tape 10, the switches 35 and 22 are closed. The tape is assumed to be wound upon the spool 13 and the motion of the tape in the direction indicated by the arrow A is being produced by unwinding the tape from the spool 12 and winding it upon the spool 13. Sound waves or other sensory effects are arranged to impinge upon the diaphragm of the microphone 36, and cause motions in the electrodynamic transducing mechanism which generate electrical currents that are representative of the sound waves. The speech currents are transmitted through the filter 31 which attenuates the frequencies below 100 cycles per second and transmit the remaining frequencies representing a band from 100 cycles to 10,000 cycles to the winding 15. The current passing through the winding 15 produces a magnetic flux which is a reasonably exact facsimile of the sound waves that impinge upon the diaphragm of the microphone.

During the above mentioned process, the switch 22 is closed and, consequently, the winding 15 derives also a current from the 60 cycle reference source 26. Consequently, the magnetic flux traversing the air gap 18 represents a superposition of two fluxes. One of these fluxes shall be designated as "reference flux," and represents an alternating reference signal having a frequency of 60 cycles per second. The other flux shall be designated as "signal flux," and represents the speech frequencies comprised within a band from 100 to 10,000 cycles per second that it is desired to record.

The "reference flux" may also be designated as representing the "operating effect," since, it will be subsequently used to control the operation of the reproducing device. The "signal flux" may also be designated as "sensory effect," said sensory effect being in this particular case represented by speech.

Before the magnetic tape 10 enters the air gap 18, it is assumed to be in demagnetized condition. It is apparent, that an extremely small portion of the tape which at a given instant is in direct neighborhood of the pole pieces 16, 17, becomes magnetized in the direction perpendicular to the axis of the tape and to the extent dependent upon the strength of the magnetic flux at the instant under consideration.

It is therefore apparent, that as the tape is moved in the direction of the arrow A, as described above, it is brought to a very high transverse magnetization by the flux set up in the pole pieces 16, 17. By "transverse magnetization" it is meant that the flux in the tape is in the direction of its thickness. In other words, a tape so magnetized may be thought of as a series of elemental magnets .125 inch wide and .001 inch long, as contrasted with a tape longitudinally magnetized by poles spaced along the tape. In the case of longitudinal magnetization, the flux in the tape is in the direction of its length, i. e., the elemental magnets will have a length equal to the distance apart of the spaced magnet poles, measured along the tape.

It is also apparent, that, after this portion of the tape has left the airgap and proceeds in the direction of the arrow towards the spool 13, a subsequent portion of the tape enters the air gap and becomes subsequently magnetized in the direction perpendicular to the tape, and to the extent dependent upon the strength of the magnetic field in the air gap at said subsequent instant. Because of the magnetic retentivity, each element of the tape, after having passed through the air gap, acquires a magnetic moment which is oriented in the direction perpendicular to the tape.

It is therefore apparent, that, the tape 10 during its motion in the direction of the arrow becomes wound upon the drum 13, and retains a succession of magnetic moments, the distribution of which with respect to the length of the tape has a relationship to the time variation of the magnetic flux in the air gap during the motion of the tape.

Assume now, that the motion of the tape 10 traversing the air gap 18 is uniform, and consider the effect of the magnetic reference signal derived from the source 26 and having the frequency of 60 cycles per second. This reference signal will distribute itself lengthwise upon the tape in such a manner, that each cycle will occupy a length of the tape that is equal to $v/60$ cm., where $v$ cm./sec. designates the lineal speed of the tape.

Simultaneously, the speech frequencies will distribute themselves lengthwise with respect to the tape in such a manner, that any speech frequency component $f$ located within the band 100–10,000 cycles per second will occupy a length of tape that is equal to $v/f$ cm. per cycle. Consequently, the time variations of the speech signals will translate themselves into special variations of the corresponding magnetic impressions in such a manner, that each cycle (i. e., each alternation per second), of speech component having a frequency $f$ will be recorded lengthwise upon an element of the tape having the length $v/f$ cm.

As the tape becomes gradually wound upon the drum 13, the diameter of the drum 13 increases, and, although the angular speed of rotation of the drum 13 may be assumed constant, the lineal speed of the tape increases as the winding progresses. In many other instances the angular speed of the drum may not be maintained at a constant value, and consequently, a situation may frequently occur in which the lineal speed $v$ cm. per second of the tape undergoes frequent and uncontrollable changes.

It has been stated in a preceding paragraph, that one cycle of the reference signal occupies $v/60$ cm. of the tape. Consequently, when the lineal speed $v$ of the tape increases, the frequency of the lineal distribution of the significant signal decreases, and when the lineal speed $v$ decreases, the frequency of the lineal distribution of the significant signal increases. Consequently, while the recording process progresses, the significant signal distributes itself sinusoidally upon the moving tape at a lineal frequency that is modulated inversely by the speed of the tape. By lineal frequency, we designate the number of alternations of the signal that is recorded lengthwise upon the unit of length of the tape. If we consider a signal having time frequency $f$, i. e., varying $f$ times per second, then it becomes apparent, that each cycle of said signal will distribute itself over a length of tape equal to $v/f$ cm. Or, in other terms, each centimeter of tape will contain $f/v$ cycles. Therefore, a signal having a time frequency of $f$ cycles per second will impress itself upon the moving tape as a signal, having a lineal frequency of $f/v$ cycles per centimeter.

It is now apparent, that the faster is the lineal speed $v$ of the tape, the lower is the lineal frequency of a corresponding signal, i. e., the smaller is the number of alternations of said signal impressed upon the unit of length of said tape. Consequently, when the recording process progresses, the speech frequencies distribute themselves upon the moving tape at corresponding lineal frequencies, that are modulated inversely by the speed of the tape. Therefore, the lineal distribution of speech signal with respect to the length of the tape is very much affected by the variation in speed of the tape during the recording process.

As it is well understood by those skilled in the art, in order to reproduce the speech signals from the magnetic impressions upon the tape, it is necessary to retranslate the lineal variation of the impressed magnetism into the corresponding time variation of the reproduced signal, i. e., it is necessary to retranslate the lineal frequencies into corresponding time frequencies. This is accomplished in a well known manner by passing the magnetized tape through a reproducing head, as explained more in detail in connection with Figure 2.

Consider now again the speech signal having the time frequency of $f$ cycles per second, which has been translated into a variable magnetization having a lineal frequency of $f/v$ cycles per centimeter. It is apparent, that in order to retranslate the lineal frequency of $f/v$ cycles per cm. back into the time frequency of $f$ cycles per second, it is necessary to move the tape during the reproducing process at a speed of exactly $v$ cm. per second. Consequently, in order to reproduce faithfully the speech signals, the tape has to undergo during the reproduction process certain preassigned speed variations. These preassigned speed variations bear a direct relationship to the corresponding speed variations, to which the tape was subjected during the recording process.

An important feature of my invention consists in simultaneously recording upon the same tape the speech signals and the reference signal. The speech signals are impressed upon the microphone 36, and then transmitted through the high pass filter 31 to the recording head 11. Since the filter 31 attenuates the frequencies below 100 cycles per second, the speech frequencies that are being transmitted and impressed magnetically upon the moving tape 10 represent a band from 100 cycles to 10,000 cycles per second. Assume, that at the instant of impression, the lineal speed of the tape was $v$ cm. per second. Therefore, the frequency band representing the time variation from 100 cycles to 10,000 cycles per second is being translated into a lineal distribution of variable magnetization representing a band of linear frequencies from $100/v$ cycles to $10{,}000/v$ cycles per centimeter of length of the tape. The reference signal derived from the source 26 is being impressed upon the tape 10 through the transformer 23 simultaneously with the speech signals. The reference signal has a time variation of 60 cycles per second, and, consequently, the corresponding signal impressed magnetically upon the moving tape has a lineal frequency of $60/v$ cycles per centimeter of the length of the tape. It is apparent, that during the process of recording the lineal speed of wire $v$ cm.sec. is not maintained constant. Therefore, the speech, as well as the reference signal have lineal frequency components that are being modulated inversely proportionately to the speed of the tape during the process of recording. Consequently, the frequency modulated reference signal impressed upon the tape is a direct indication of the speed variation of the tape during the recording process.

My invention consists, therefore, in utilizing the recording of the reference signal in order to reproduce the speed variations of the tape, and thus to make it possible the simultaneous faithful reproduction of the recorded speech signals. It is apparent, that the modulation of the lineal frequency of the recorded reference signal depends upon the lineal speed of the tape during the time when the recording took place, and, therefore, by knowing the value of frequency modulation of the reference signal throughout the length of the tape I am capable of reproducing the lineal speed of the tape. On the other hand, by reproducing faithfully the lineal speed of the tape, I am capable of retranslating the recorded lineal speech frequencies contained in the band from $100/v$ cycles to $10{,}000/v$ cycles per centimeter of length of the tape into the corresponding time variations which reproduce the actual speech and are contained within a band from 100 cycles to 10,000 cycles per second.

Another important feature of my invention consists in a system of marking of the sound carrier in such a manner, that any portion of the subject matter contained in the recorded speech can be immediately located and referred to with respect to said markings. I am accomplishing this object by providing a system of counting the successive lineal wave length of the recorded reference signal. The counting is being effected by means of an electric clock mechanism 39 having its input terminals connected to leads 24 by means of a switch 40. The mechanism 39 acts as a cycle counter, i. e., it is capable of counting the number of cycles derived from the source 26.

Consider now the instant of beginning of the recording process. The drum 12 is completely wound with unmagnetized tape and the drum 13 is consequently unwound. The cycle counter 39 is set to zero. The recording process commences by closing the switches 22, 35, 40 and setting the driving mechanism 9 in motion. Consequently, the drum 12 begins to unwind itself, and the tape 10 is set into progressive motion through the air gap 18 in the direction indicated by the arrow A. The reference source 26 starts to actuate the counter 39 and simultaneously begins to impress the reference signal upon the moving tape 10. At the same time the speech signals are being impressed upon the tape from the microphone 36. The cycle counter 39 comprises an indicating pointer 41 rotatable clockwise with respect to the graduated scale 42 and arranged in such a manner that the angular displacement of the pointer 41 indicated on the scale 42 represents at any instant the number of cycles of reference signal derived from the source 26 that have been impressed upon the movable tape 10, since the initial instant corresponding to the closing of the switches 22, 25 and 40. It is apparent, that since this initial instant the tape 10 has effected a lineal displacement, and that the length of the displaced tape is equal to the sum of the individual lengths of the individual lineal cycles of the reference signal impressed upon the tape since the initial instant. Since the frequency of the reference signal is 60 cycles per second, the lineal length of the individual cycles is $v/60$ cm. and, since the lineal speed of the tape represented as $v$ cm./sec. varies, the length of the lineal cycle of the reference signal varies as a function of the lineal speed of the tape.

Consequently, the angular displacement of the pointer 41 does not represent the length of the displaced tape, but it represents the number of lineal cycles of the reference signal impressed upon said portion of tape.

It is now apparent, that the distance between any selected point of the tape and the point corresponding to the beginning of the tape can be measured by means of two different methods. The first method consists in determining the number of units of lengths, say centimeters separating the two points and represents the total length of the tape from the initial point to the point under consideration. The second method consists in determining the number of lineal cycles impressed upon the portion of tape separating the initial point and the point under consideration. It is obvious, that the lineal cycles are not equal one to another in length; they correspond, however, to equal time intervals, each of said time intervals representing $1/60$ of a second. Consequently, the second method identifies any selected point of the tape not by its actual distance from the initial point measured in centimeters but by the amount of time that has elapsed since the initial instant until the instant at which the displacement of the tape has reached the selected point, i. e., until the instant at which the selected point is passing through the recording head. In my present invention I am utilizing the second method of measurement. It can be readily understood, that while the tape is moving in the direction of the arrow A, the indication of the cycle counter 39 represents at any instant the number of lineal cycles of the reference signal separating the point of the tape passing through the recording head 11 from the initial point of the tape. Conversely, each point of the tape can be identified by means of a number which represents the number of lineal cycles of the reference signal separating said point from the initial point of the tape. It is apparent, that the number identifying each point of the tape is indicated by means of the pointer 41 upon the scale 42 at the instant at which said portion passed through the recording head 11 during the recording process.

Assume now, that the speech recorded on the tape contains a certain preliminary part and a certain subject matter of particular interest, which began to be recorded when the cycle counter 39 indicated 15,753 and finished to be recorded when the cycle counter indicated 17,967. Consequently, the subject matter under consideration is recorded upon the portion of the tape contained between two limiting points. One limiting point is distant from the beginning of the tape by 15,753 lineal cycles and the other limiting point is distant from the beginning of the tape by 17,967 lineal cycles. Consequently, in order to reproduce and properly recognize the significant portion of the speech I am providing an arrangement for counting the lineal cycles of the reference signal during the reproducing process and take into particular consideration the instant at which the counter has reproduced 15,753 lineal cycles and a subsequent instant at which the counter has reproduced 17,967 lineal cycles. Therefore, the significant portion of the reproduced speech is contained between these two instants.

Figure 2:
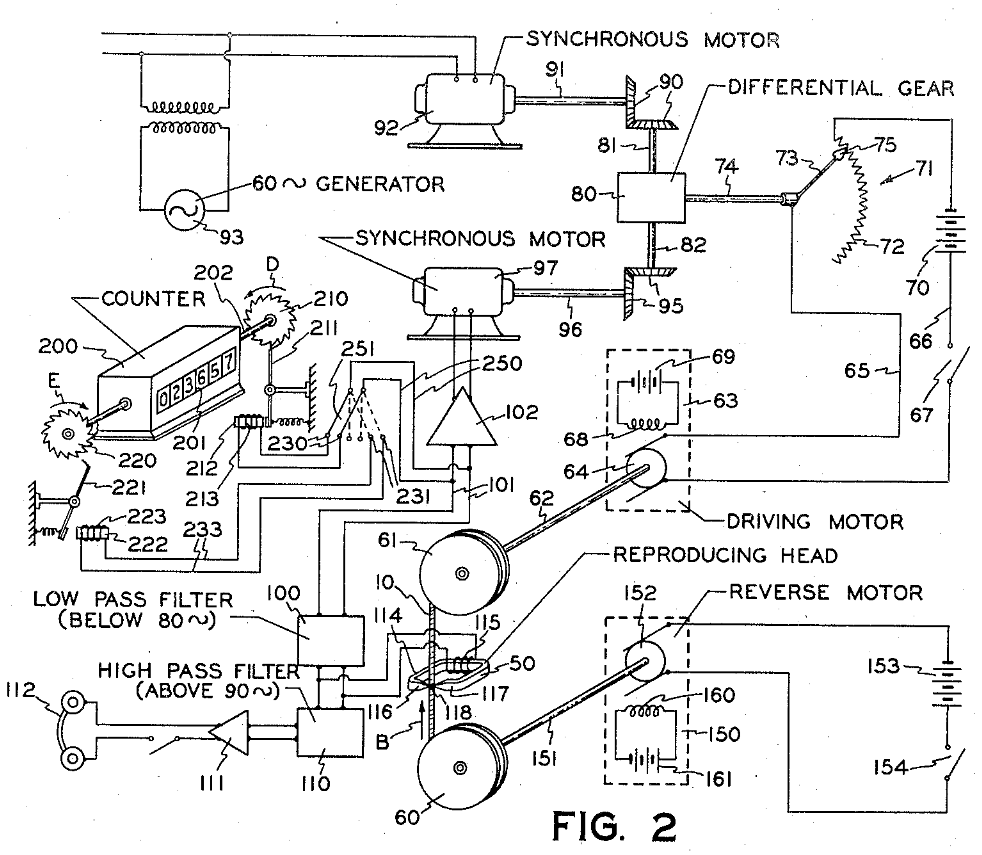
Figure 2 represents an arrangement for reproducing the signals impressed upon the tape or wire in a manner shown in Figure 1.

Referring now to Fig. 2, the acoustic reproducing apparatus of the telegraphone type is employed, which comprises the previously recorded telegraphone steel tape or wire 10. The usual reproducing head 50 is associated with the tape or wire at a point between the two spools 60, 61. In order to reproduce the speech signal impressed magnetically upon the tape 10, the tape has to be moved linearly through the reproducing head 50 in the direction indicated by the arrow B. At the initial instant, the magnetized tape containing the record of the speech impressed thereon by means of the arrangement of Fig. 1 is completely wound upon the spool 60, the speech is being reproduced by progressively unwinding the spool 60, whereby the tape 10 is made to move past the reproducing head 50 and becomes progressively wound upon the spool 61. As shown in the figure, the unwinding of the spool 60 and the simultaneous winding of the spool 61 is being effected by means of a D. C. motor contained in a dotted rectangle 63, the said D. C. motor being adapted to drive the spool 61 in a clockwise direction by means of the shaft 62. The D. C. motor comprises an armature 64 having one of its input terminals connected to lead 65 and the other input terminal connected to lead 66 through a switch 67 and comprises an excitation winding 68 energized by the battery 69. The input leads 65, 66 of the motor are connected through a battery 70 to a variable rheostat 71. The variable rheostat comprises a semicircular resistor 72 and a movable member 73 rotated by a shaft 74 and having its extreme portion 75 slidably engaged with the semicircular resistor 72. One of the terminals of the semicircular resistor 72 is connected through the battery 70 to lead 66, while the slidable element 75 is electrically connected to the lead 65. The shaft 74 constitutes the output shaft of a differential gear 80 of a standard construction. As shown in the figure, the differential gear 80 is provided with two input shafts 81 and 82 and is arranged to drive the output shaft 74 at a speed representing the difference of the angular speeds of the two input shafts 81 and 82. Consequently, when the shafts 81 and 82 rotate at equal speeds, the output shaft 74 of the differential gear is stationary, or when one of the input shafts rotates at a speed larger than the other, then the output shaft 74 of the differential gear rotates at a speed representing the difference of the two input shafts 81 and 82. The input shaft 81 is connected through the gear wheels 90 to a shaft 91 driven by a synchronous motor 92. The motor 92 is energized by source of power supply 93 at a frequency of 60 cycles and is maintained at a constant rotational speed. The shaft 82 is driven through the gears 95 by the shaft 96 which is in turn driven by a synchronous motor 97. The motor 97 is energized by a portion of the output derived from the reproducing head 50 the said portion being transmitted to the motor 97 through a low pass filter 100, leads 101, and amplifier 102. Another portion of the output derived from the reproduced head 50 is transmitted through a high pass filter 110 and amplifier 111 to head phones 112. The low pass filter 100 is designed to transmit frequencies below 80 cycles per second and to attenuate frequencies above 80 cycles per second. The high pass filter 110 is designed to transmit frequencies above 90 cycles per second and to attenuate frequencies below 90 cycles per second.

The reproducer head 50 is structurally similar to the recording head 11 of Fig. 1. In particular, the reproducer head 50 consists of an electromagnet having an iron core 114 and a winding 115 wound around the core 114. The core 114 is provided with two pole pieces 116, 117 having a form of two relatively sharp edges and immediately adjacent one to another. The narrow air gap between the pole pieces 116, 117 is designated by 118. The tape 10 is made to pass through the air gap 118 in such a manner that the plane of the tape is perpendicular to the line joining the pole pieces 116 and 117.

The tape 10 is arranged to be driven linearly either in the direction indicated by the arrow B, or in the reverse direction opposite to the arrow B. When it is desired to reproduce the speech from the record upon the tape 10, the switch 67 is closed. Consequently, the motor 63 becomes energized and causes the spool 61 to rotate in clockwise direction. Then the tape becomes unwound from the spool 60 and progresses linearly through the reproducing head in the direction of the arrow B.

At various occasions, however, it is found necessary or desirable to move the tape 10 in the reverse direction opposite to the direction of the arrow B. For instance after a certain portion of the tape has been already reproduced into speech and conseqently wound upon the spool 61, it is often found desirable to repeat the reproduction of said portion. Consequently, said portion of tape has to be unwound from the spool 61 and wound upon the spool 60 before the reproduction recommences. As shown in the figure, the unwinding of the spool 61 and the simultaneous winding of the spool 60 may be effected by means of a D. C. motor contained in a dotted rectangle 150, the said D. C. motor being adapted to drive the spool 60 in an anticlockwise direction by means of the shaft 151. The D. C. motor comprises an armature 152 having its input terminals connected to a battery 153 through a switch 154, and comprises an excitation winding 160 energized by the battery 161. It is now apparent, that whenever it is desired to run the tape 10 in the reverse direction, then switch 67 is opened and the switch 154 is closed. Consequently, the driving motor 63 is deenergized and the reverse motor 150 becomes energized, thus causing the winding of the spool 60, simultaneous winding of the spool 61 and the lineal motion of the tape 10 in the direction opposite to the arrow B. After the backwinding of desired portion of the tape has been completed, the said portion of the tape can be retranslated again into speech by repeating the winding motion which causes the tape to move in the direction of the arrow B. It should be borne in mind that during the backwinding motion the driving motor 63 is deenergized by opening the switch 67 and the reverse motor 150 is energized by closing the switch 154. However, on the other hand during the process of reproducing speech from the magnetized tape the reverse motor 150 is deenergized by opening the switch 154 and the driving motor 63 is energized by closing the switch 67.

The essential feature of the device shown in Fig. 2 consists in controlling the speed of the driving motor 63 by means of rheostat 71 so as to maintain the lineal speed of the magnetized tape 10 during the reproduction process in a determined relation to the lineal speed of the tape 10 when it was subjected to the magnetizing influences by means of the device of Fig. 1. The lineal speed of the tape 10 in Fig. 2 is controlled by means of the reference signal to which the tape 10 was subjected during the magnetizing process when it was actuated by means of the device of Fig. 1.

Consider now Fig. 2, and assume that the magnetized tape 10 is being driven in the direction of the arrow B, the driving force being derived from the D. C. motor 63 which rotates the spool 61 through the shaft 62. The magnetized tape has impressed thereon two signals, one said signal being derived from speed frequencies impressed by means of the microphone 36 in Fig. 1 and the other signal being derived from the reference signal of 60 cycles per second generated by the source 26 in Fig. 1. Both signals have lineal distribution that is the result of modulation of speech frequencies and the reference frequency by the speed of tape during the recording process, the said modulation being inversely proportional to speed. As explained more in detail, the magnetic impressions of speech signals occupy a band of lineal frequencies from $100/v$ cycles to $10{,}000/v$ cycles per centimeter of length of tape. In a similar manner the magnetic impression of the reference signal has a lineal frequency of $60/v$ cycles per centimeter of length of the tape.

My invention is based upon the fact that the lineal frequency of the reference signal depends upon the speed variations of the tape during the recording process. Therefore, by utilizing the recording of the reference signal I am capable of reproducing the speed variations of the tape and thus making it possible the simultaneous faithful reproduction of the recorded speech signals. In such a manner I am capable of retranslating the recorded lineal speech frequencies contained in the band from $100/v$ cycles to $10{,}000/v$ cycles per centimeter of length of the tape into the corresponding time variations which reproduce the actual speech and are contained within a band from 100 cycles to 10,000 cycles per second.

Consider now again Fig. 2 and assume that the switch 67 is closed and the switch 154 is open. Then the driving motor 63 becomes energized by the battery 70 and causes the spool 61 to rotate in clockwise direction. This in turn causes the unwinding of the spool 60, and produces the motion of the tape in the direction of the arrow B. It is now apparent, that the successive portions of the tape containing the magnetic impressions of the speech signal and the reference signal pass through the air gap 118 between the pole pieces 117, 118.

In the manner shown, the pole pieces 116, 117 will each supply a convenient magnetic path for the changing flux resulting from the passage of the magnetized tape and cause this flux to pass through the associated coil 115. This changing flux generates a voltage in the coil 115. It is apparent, that both the speech signal and the reference signal are being reproduced in form of currents in the output of the reproducing head 50. It has been assumed, that the speech signals occupy a band of lineal frequencies from $100/v$ cycles to $10,000/v$ cycles per cm. and, that the reference signal has a lineal frequency of $60/v$ cycles per cm. of the length of the tape. Assume also, that at the instant under consideration the lineal speed of the tape is $v$ cm./sec., i. e., it is the same as the lineal speed during a prior instant when the same portion of tape received magnetic impressions by means of the apparatus of Fig. 1. It is, therefore, apparent, that under these conditions the output of the reproducing head gives the exact replica of both the speech signal and the reference signal. Therefore, we obtain across the output terminals of the winding 115 the speech signal occupying a band from 100 cycles to 10,000 cycles per second and the reference signal having the frequency of 60 cycles per second. As shown in the drawing, both signals are being separated by means of the filters 100 and 110 in such a manner that the speech frequencies are transmitted through the filter 110, become subsequently amplified in the amplifier 111 and can be heard subsequently by means of the earphones 112; while, on the other hand, the reference frequency which at this particular instant is exactly equal to 60 cycles per second, is transmitted through the filter 100, becomes amplified in the amplifier 102 and is used to energize the synchronous motor 97.

Consider now the synchronous motor 92. This motor is energized continuously by the source 93, and, consequently, the speed of this motor is always constant, since the frequency of the source 93 is always constant and equal to 60 cycles per second. At the instant under consideration we have assumed that the lineal speed of the tape 10 is $v$ cm./sec. and, consequently, the voltage derived from the filter 100 and energizing the synchronous motor 97 has also a frequency of 60 cycles per second. Thus both synchronous motors 97 and 92 are energized by two different sources, each having a frequency of 60 cycles per second. Consequently, they rotate at the same speed and therefore the output shaft 74 of the differential gear 80 is stationary. Thus the rheostat element 73 remains stationary and the speed of the motor 63 remains the same.

Assume now, that an instant later the lineal speed of the tape traversing the air gap 118 has departed from the value $v$ cm./sec. which corresponded to the speed during the instant at which it received the magnetic impressions by means of the instrument of Fig. 1. Let the new speed of the tape at this later instant be $(v+\Delta v)$ cm./sec., where $\Delta v$ cm./sec. represent the increment of the lineal speed of a portion of the tape during the instant of reproduction of the signal, as compared to the linear speed of the same portion of the tape during the instant of impression of the same signal. The value of $\Delta v$ may be either positive or negative. If $\Delta v$ is positive, then the speed of the tape during the reproduction is greater than the corresponding speed during the impression of the signal. If $\Delta v$ is negative, the speed during reproduction is smaller than during the impression of the same signal. It is now apparent that under these conditions the reproducing head does not give any more the exact replica of the speech signal, and of the reference signal. We obtain then across the output terminals of the winding 115 a distorted speech signal the band of which has been shifted upwards or downwards (depending upon the sign of $\Delta v$) and occupies a width from $$100\left(1+\frac{\Delta v}{v}\right)$$

cycles to $$10,000\left(1+\frac{\Delta v}{v}\right)$$

cycles per second. The reference signal will have then the frequency of $$60\left(1+\frac{\Delta v}{v}\right)$$

cycles per second. The value $$\frac{\Delta v}{v}$$

is assumed to be always small comparing to one. Consequently, the band of speech frequencies even if shifted downwards will always be above 90 cycles per second and will be transmitted through the high pass filter 110 to the earphones 112. Similarly, the shifted frequency of the reference signal will always be below 80 cycles per second and will be transmitted through the filter 100 to the synchronous motor 97.

In my present invention I am providing a controlling arrangement that is responsive to the variation of the reference signal from the value of 60 cycles per second to the new value of $$60\left(1+\frac{\Delta v}{v}\right)$$

cycles per second, and tends instantaneously to restore the speed of the tape from $(v+\Delta v)$ cm./sec. to $v$ cm. As soon as the speed of the tape is restored, the speech signals resume their normal band from 100 cycles to 10,000 cycles per second, and no more speech distortion takes place. The controlling arrangement that maintains the speed of the tape during the reproduction at a value $v$ cm./sec., consists essentially of four main elements: the synchronous motors 97 and 92, the differential gear 80, the rheostat 71, and of suitable mechanical connections between these elements. The manner in which the controlling arrangement tends to counter-balance any departure of the speed of the tape during the reproduction, from the corresponding values of the speed when the tape received the impression, can be explained as follows:

Whenever the departure of speed of the tape from the preassigned value $v$ cm./sec. to a new value $(v+\Delta v)$ cm./sec. occurs, the reference signal derived from the reproducing head undergoes a frequency change from 60 cycles per second to $$60\left(1+\frac{\Delta v}{v}\right)$$

cycles per second. Consequently, a frequency of $$60\left(1+\frac{\Delta v}{v}\right)$$

is transmitted through the filter 100 and applied to the synchronous motor 97, thus causing the motor 97 to run at a speed that is different from the speed of the motor 92. If $\Delta v$ is positive, the speed of the motor 97 tends to be faster than the speed of the motor 92, and, on the other hand, if $\Delta v$ is negative, the speed of the motor 97 tends to be slower than the speed of the motor 92. Consequently, the two input shafts 81 and 82 that are respectively connected to motors 92 and 97 rotate at different speeds and cause a rotation of the output shaft 74 of the differential gear 80. The shaft 74 is made to actuate the rheostat 71 by rotating the pointer 73 with respect to the semi-circular resistor 72, and thus controls the current supplied by the battery 70 to the armature winding of the motor 63. The speed of the motor 63 depends upon the value of this current.

The whole controlling arrangement is designed in such a manner that whenever the tape 10 departs from its lineal speed $v$. cm./sec., the motor 97 departs from synchronism with respect to the motor 92. This causes the differential gear 80 to actuate the rheostat 71, and acts upon the speed of the driving motor 63 in such a manner as to restore the lineal speed of the tape to its value $v$ cm./sec. If, for instance, the increment $\Delta v$ is positive, then the motor 97 tends to rotate faster than the motor 92 and the differential gear 80 moves the pointer 73 by a small amount which is sufficient to decrease the current of the motor 63. This in turn causes the motor 63 to decrease the speed, and to move the tape 10 at a decreased lineal speed.

It is, of course, apparent, that the lineal speed $v$ cm./sec. of the tape is not necessarily constant. In the most usual cases $v$ varies from one instant to another, since in the arrangement of Fig. 1 the spool 10 becomes gradually wound by the tape 10, and, consequently, the diameter of spool 10 increases while at the same time the rotatory speed of the spool 10 is being maintained only approximately constant by the driving mechanism 15. Therefore, during the process of reproduction when we state that the lineal speed of the tape becomes $(v+\Delta v)$ cm./sec., we do not mean to say that the tape has departed from a constant value $v$ by an amount $\Delta v$. We wish to say only, that the speed of the tape has departed from a particular value $v$ that it had at a corresponding prior instant when the particular portion of tape under consideration received the magnetic impressions by maintaining the speed of the tape at a value $v$.

A particularly important feature of my arrangement consists of a revolution counter 200 included in the apparatus of Fig. 2. The revolution counter is adapted to indicate the passage of any selected section of the sound tape through the reproducing head 50. As shown in Fig. 2 the revolution counter is provided with windows 201 which contain a number showing how many revolutions the shaft 202 has rotated. The revolutions are counted from a certain initial instant corresponding to the beginning of the reproduction from the tape 10. They are counted positively when the shaft 202 rotates counterclockwise in the direction of the arrow D and they are counted negatively when the shaft 202 rotates clockwise in the direction of the arrow E. In the example shown in the figure, the windows 201 indicate a number 23,657, i. e., the total positive angular displacement of the shaft 202 amounts to 23,657 revolutions.

As shown in the figure, the shaft 202 is adapted to be rotated in the positive (counterclockwise) direction by means of a toothed wheel 210 which is engaged with the ratchet 211. The ratchet has its extremity in the neighborhood of an electromagnet 212 and can be set into a vibratory motion, if an alternating current is impressed to the winding 213 of the electromagnet. In an analogous manner the shaft may be rotated in the negative (clockwise) direction by means of a toothed wheel 220 which is engaged with a ratchet 221. The ratchet 221 has its extremity in the neighborhood of an electromagnet 222 and can be set into vibratory motion, if an alternating current is impressed to the winding 223 of the electromagnet. The windings 213 and 223 are respectively connected to the input terminals 230 and 231 through the leads 232 and 233.

It is apparent, that when an alternating current is impressed across the input terminals 230, the shaft 202 is set into a rotary motion in such a manner that to each alternation of the current applied to the terminals 230 corresponds one positive revolution of the shaft 202. In a similar manner, when an alternating current is impressed across the input terminals 231, the shaft 202 is set into a rotatory motion in such a manner, that to each alternation of the current applied to the terminals 231 corresponds one negative revolution of the shaft 202.

The output of the filter 100 can be connected either to the input terminals 230 or 231 by means of leads 250 and of the switch 251. In Fig. 2 the position of the switch 251 indicated by full lines causes the leads 250 to be connected to the input terminals 230. An alternate position of the switch 250 indicated by dotted lines causes the leads 250 to be connected to input terminals 231.

Consider now again the arrangement of Fig. 2 at the initial instant, i. e., when the reproducing of the speech signals from the tape 10 is about to commence. At that instant, the spool 60 is completely wound with the magnetized tape, while the spool 61 is completely unwound. At the same time, the swtiches 67 and 154 are open, the switch 251 is in neutral position (thus disconnecting the leads 250 from either the input terminals 230, 231) and the counter 200 indicates the number zero. In order to initiate the reproducing process the switch 67 is closed and the switch 251 is made to connect the leads 250 to the input terminals 230 (as illustrated in Fig. 2). Consequently, the magnetized tape 10 is progressively advanced through the reproducing head 50, thereby causing speech signals to be transmitted through the filter 110 to the earphones 112 and the reference signal to be transmitted through the filter 100 and to be applied through the input terminals 230 to the winding 213 of the electromagnet 212.

It is apparent, that there exists a fixed relationship between the linear travel of the tape 10 and the voltage applied across the terminals 230, i. e., to each lineal cycle of the reference signal recorded on the tape corresponds one alternation of the voltage applied across the terminals 230. Consequently, to each linear cycle of the reference signal corresponds one complete revolution of the shaft 202 in the counterclockwise direction. When the spool 60 is fully wound with sound tape the shaft 202 is at its starting condition and the counter 200 indicates the value zero. When, however, the spool 61 is rotated by the motor 63 so that the sound tape is progressively advanced through the soundhead in the direction of the arrow B a rotatory motion of the shaft 202 in the anticlockwise direction simultaneously takes place. If, for instance, the length of the tape that has passed through the recording head since the initial instant is such that it contains 68,747 linear cycles of the reference signal, then the total number of revolutions performed by the shaft 202 in the counterclockwise direction is 68,747, and the counter 200 will accordingly indicate the number 68,747. Consequently, the number indicated by the counter 200 serves to identify the particular portion of the tape that passes through the recording head at the instant under consideration.

In our prior discussion regarding the device of Fig. 1, we explained the manner in which the successive points of the tape 10 that receive the magnetic impression are being identified by means of the cycle counter 39. It is apparent that in the arrangement of Fig. 2 we use the same method of identification which consists in indicating the number of lineal cycles of reference signal that is contained between the initial point and the point under consideration. Consequently, any selected portion of speech or music which has been impressed upon a portion of tape separated by two numerical indications of the cycle counter 39, said numerical indications being for instance 79,891 and 283,632 can be reproduced by means of the device of Fig. 2. Such a reproduction will commence when the counter 200 indicates the number 79,891 and will finish when the counter indicates the number 283,632.

In the operation of the reproducing device it is frequently desirable to run the sound tape backwards in order to reproduce again a selected portion of speech. In order to repeat a reproduction, it is necessary to disconnect the switch 67, whereby the driving motor 63 becomes deenergized, and to connect the switch 154 thereby energizing the reverse motor 150, and causing the tape 10 to move linearly in the direction opposite to that of the arrow B. At the same time the connection between the leads 250 and the input terminals 230 is disconnected, and the switch 251 is made to connect the leads 250 to the input terminals 231. Under these conditions, the reference signal derived from the recording head 50 and transmitted through the filter 100 is applied to the input terminals 231, and causes the shaft to rotate in a clockwise direction thus imparting negative angular displacements, which cause the indication of the counter 200 to decrease by an amount representing the number of revolutions performed in the clockwise direction. Therefore, there is a correspondence between the lineal motion of the sound tape and the corresponding rotation of the shaft 202. When the sound tape is displaced linearly in the direction of the arrow B, the shaft 201 is displaced angularly in the positive direction by the corresponding amount, and when the tape is displaced linearly in the opposite direction, the angular displacement of the shaft 201 will be in opposite direction too. It can be therefore readily visualized, that any portion of the sound tape, when passing through the recording head, will cause the appearance at the window 201 of the counter 200 of a number, which will identify the particular portion of the sound tape. It can be also visualized, that the particular number identifying the portion of the sound tape passing through the recording head 60 is independent of any previous displacements of the sound tape which might have been made in the direction of the arrow B, or in the opposite direction.

It is, therefore, apparent that when the spool 61 is driven by the motor 63 so that the sound wire or tape will be progressively advanced through the reproducing head 50, the number indicated by the counter 200 will increase, indicating progressively the length of the sound tape removed from the spool 60. If the spool 60 is driven by the reverse motor 150, sound tape will leave spool 61 and be taken up or rewound upon the spool 60, and the indication of the counter 200 will accordingly decrease. A reading of the counter 200 at any particular time will indicate the amount of sound wire then unreeled or unwound from the spool 60.

It is now seen, that by merely making a written notation of the position of the pointer 41 upon the graduated scale 42 of the cycle counter 39 when a selection is recorded, the location of the particular section of the sound tape having the selection impressed thereupon can thereafter be readily determined by means of the counter 200. The pointer 41 moves whenever the spools carrying the sound tape are rotated. On the other hand, by referring now to the reproducing arrangement of Fig. 2 a fixed relationship between the lineal travel of the sound tape through the sound reproducing head 50, and the numerical indication of the counter 200 is at all times assured. When a particular selection is to be recorded on the tape, the position of the pointer 41 with respect to the scale 42 is again noted and recorded. When at any time thereafter that particular selection is desired, the spool 61 is rotated in the proper direction until the counter 200 indicates that the chosen selection has reached the reproducing head 50. The reproducing head 50 can be then put in operation and the particular selection reproduced. Likewise, the numerical indication given by the counter 200 will indicate when the end of the selection has been reached.

The counter 200 accurately indicates the location of any desired talk or musical selection. This device operates in such a manner, that the relationship between the lineal movement of the tape through the sound recording or reproducing head and the corresponding indication is always maintained, no matter how many times the reels are wound or unwound. By making a simple notation when the record is made, the beginning and end of any particular selection recorded on the sound tape can, with my device, be very accurately determined. The machine can be set to reproduce any desired selection without delay, annoyance or disturbance.

I claim:

1. An apparatus for moving a physical medium, said physical medium having impressed thereon a signal, comprising a pick-up element mounted in operative relation to said medium for translating said impressed signal into an electric current, and means responsive to said current for controlling the relative motion between said medium and said pick-up element, and another means responsive to said current for indicating the displacement between said medium and said pick-up element.

2. In combination, a movable magnetizable member having magnetically impressed thereon a signal, a reproducing head mounted in operative relation to said member for translating said impressed signal into an electric current, means responsive to said current for controlling the relative motion of said member with respect to said reproducing head, and another means responsive to said current for indicating various portions of said member.

3. A reproducer for reproducing signals from a physical medium, said medium having impressed thereon two signals differing one from another by distinguishable characteristics, comprising a pick-up element mounted in operative relation to said medium for translating said two impressed signals into two electrical currents having distinguishable characteristics, means connected to said pick-up element for separating said currents, a driving element responsive to one of said separate currents for controlling the relative motion between said medium and said pick-up element, and an indicating element responsive to the other separated current for indicating the displacement between said pick-up element and said medium.

4. In combination a reproducing device for reproducing signals from a record body; means for driving said body relatively to said reproducing device, thereby reproducing signals contained in said record body, a control element responsive to said signals for controlling said means, and an indicating means responsive to said signals for indicating the motion between said body and said reproducing device.

5. The combination with a reproducer having a record carrier in form of a magnetizable member having impressed thereon linearly distributed periodic signal, means in operative relationship to said member and directly responsive to the lineal distribution of said signal for translating said lineal distribution into periodic electrical current, an indicating device, said device comprising a revolution counter and means responsive to said current for driving said revolution counter.

6. A sound recording and reproducing system, comprising two reels, a magnetizable sound wire movable from one reel to another, said wire having impressed thereon two signals, the first signal representing a sensorial sequence and the second signal being a reference signal recurrently distributed with respect to the length of the wire, an electric pick-up element mounted in operative relation to said wire for translating said two signals into two corresponding currents, said two currents having frequency characteristics differing one from the other, an electric filtering system connected to said pick-up element and providing two channels for separating the currents corresponding to said first and second signal, a reproducer connected to one of said channels for reproducing said first signal, a rotary element connected to the other channel for rotating in a definite speed relationship to the frequency of said second signal, and means operated in conjunction with said element for indicating the number of revolutions of said element, where said indication is correlated with the output of said reproducer.

7. A reproducer system for reproducing signals from a movable record carrier, said carrier having impressed thereon two signals differing one from another by distinguishable characteristics, comprising a pick-up element mounted in operative relation to said carrier for translating said two impressed signals into two corresponding electrical currents having distinguishable characteristics, means connected to said pick-up element and providing two channels for separating said two currents, a reproducing element connected to one of said channels and responsive to one of said currents for reproducing one of said signals, and means connected to the other channel and responsive to the other current for providing a signal representing the displacement between said pick-up element and said carrier, whereby the signal reproduced by means of said reproducing element is correlated with said displacement representing signal.

8. A reproducer system for reproducing signals from a movable physical medium, said medium having impressed thereon two signals differing one from another by distinguishable characteristics, the first of said signals being recurrently distributed with respect to said medium, comprising a pick-up element mounted in operative relationship to said medium for translating said two impressed signals into two corresponding electrical currents having distinguishable characteristics, the first of said currents corresponding to the first signal varying recurrently with respect to time, means connected to said pick-up element and providing two channels for separating said two currents, an indicating element operated in relationship to a selected initial instant and responsive to the first of said currents for indicating at any moment the number of recurrences of said first current that have elapsed since said initial instant, and a reproducer responsive to said second current for reproducing said second current.

9. A reproducer system for reproducing signals from a movable physical medium, said medium having impressed thereon two signals, said signals differing one from the other by their frequency characteristics comprising a pick-up element mounted in operative relationship to said movable medium for translating said two signals into two electrical currents having frequency characteristics dependent upon the frequency characteristics of the corresponding signals, an electric filtering system connected to said pick-up element and providing two channels for separating said two currents, a reproducer connected to one of said channels for reproducing one of said currents, a rotary element connected to the other channel for rotating in a definite speed relationship to the frequency of the current derived from said channel, and a means operated in conjunction with said element for indicating the number of revolutions of said element, whereby said indication is correlated with the output of said reproducer.

10. A reproducer for reproducing signals from a movable magnetizable wire, said wire having magnetically impressed thereon a signal recurrently distributed with respect to the length of said wire, comprising means mounted in operative relationship to said wire for translating said signal into a recurrently varying electrical signal, and an indicating device operated in relationship to a selected initial instant and responsive to said electrical signal for indicating at any moment the number of recurrences of said electrical signal that have elapsed since said initial instant.

11. In combination with a record carrier having signals recorded thereon throughout the length thereof, means for moving said record carrier, means responsive to movement of said record carrier for translating said recorded signals into electrical signals, means responsive to said electrical signals for governing the speed of movement of said record carrier, and means also responsive to said electrical signals for producing an effect representative of the position along said carrier at which said signal translation is occurring.

JACOB NEUFELD.

REFERENCES CITED

The following references are of record in the file of this patent:

UNITED STATES PATENTS

| Number | Name | Date |
|---|---|---|
| 1,867,685 | Sperry | July 19, 1932 |
| 1,909,765 | Jenkins | May 16, 1933 |
| 1,921,494 | Wildhaber | Aug. 8, 1933 |
| 1,989,965 | Beverage | Feb. 5, 1935 |
| 2,024,608 | Smythe | Dec. 13, 1935 |
| 2,024,609 | Smythe | Dec. 13, 1935 |
| 2,076,937 | Cannon | Apr. 13, 1937 |
| 2,279,018 | Wolfe | Apr. 7, 1942 |
| 2,338,991 | Arnold | Jan. 11, 1944 |
| 2,396,409 | Berzer | Mar. 12, 1946 |